(12) United States Patent
Nickum

(10) Patent No.: US 6,760,600 B2
(45) Date of Patent: *Jul. 6, 2004

(54) PORTABLE COMMUNICATION APPARATUS

(75) Inventor: Larry A. Nickum, Sioux City, IA (US)

(73) Assignee: Gateway, Inc., Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/238,863

(22) Filed: Jan. 27, 1999

(65) Prior Publication Data

US 2001/0039195 A1 Nov. 8, 2001

(51) Int. Cl.[7] .................................................. H04M 1/00
(52) U.S. Cl. .................. 455/557; 455/556.1; 455/556.2
(58) Field of Search ................................. 455/557, 556, 455/575, 550, 552, 558, 556.1, 556.2; 340/825.44, 7.29, 7.54

(56) References Cited

U.S. PATENT DOCUMENTS

| | | | | |
|---|---|---|---|---|
| 5,020,090 A | | 5/1991 | Morris | 379/58 |
| 5,109,539 A | * | 4/1992 | Inubushi et al. | 455/575 |
| 5,138,651 A | * | 8/1992 | Sudo | 455/462 |
| 5,197,091 A | * | 3/1993 | Takagi et al. | 455/550 |
| 5,337,044 A | * | 8/1994 | Folger et al. | 340/825.44 |
| 5,485,505 A | * | 1/1996 | Norman et al. | 455/419 |
| 5,497,339 A | * | 3/1996 | Bernard | 708/109 |
| 5,533,097 A | * | 7/1996 | Crane et al. | 455/552 |
| 5,555,449 A | * | 9/1996 | Kim | 455/575 |
| 5,611,055 A | * | 3/1997 | Krishan et al. | 710/101 |
| 5,625,673 A | * | 4/1997 | Grewe et al. | 455/556 |
| 5,678,229 A | * | 10/1997 | Seki et al. | 455/343 |
| 5,793,989 A | * | 8/1998 | Moss et al. | 710/105 |
| 5,812,953 A | * | 9/1998 | Griffith et al. | 455/550 |
| 5,822,692 A | * | 10/1998 | Krishan et al. | 455/419 |
| 5,854,984 A | * | 12/1998 | Buhrmann et al. | 455/550 |
| 5,873,045 A | * | 2/1999 | Lee et al. | 455/550 |
| 5,884,190 A | * | 3/1999 | Lintula et al. | 455/557 |
| 5,892,432 A | * | 4/1999 | Skoog | 340/313 |
| 5,898,758 A | * | 4/1999 | Rosenberg | 379/433 |
| 5,907,815 A | * | 5/1999 | Grimm et al. | 455/557 |
| 5,924,044 A | * | 7/1999 | Vannatta et al. | 455/556 |
| 6,009,309 A | * | 12/1999 | Okada et al. | 340/7.63 |
| 6,018,232 A | * | 1/2000 | Nelson et al. | 320/127 |
| 6,028,556 A | * | 2/2000 | Shiraki | 343/702 |
| 6,035,214 A | * | 3/2000 | Henderson | 455/556 |
| 6,052,464 A | * | 4/2000 | Harris et al. | 379/433.07 |
| 6,101,402 A | * | 8/2000 | Bartha et al. | 455/569 |

FOREIGN PATENT DOCUMENTS

| | | | | |
|---|---|---|---|---|
| EP | 0999680 | * | 5/2000 | |
| GB | 2269072 | * | 1/1994 | |
| JP | 06336806 | | 6/1996 | H04Q/7/38 |
| WO | WO 94/29968 A1 | * | 12/1994 | |
| WO | 96/10229 | | 4/1996 | G06F/13/00 |

OTHER PUBLICATIONS

Newton, "Newton's Telecom Dictionary", "The Official Dictionary of Telecommunications", Mar., 1998, pp. 538–539.*

* cited by examiner

Primary Examiner—Charles Appiah
(74) Attorney, Agent, or Firm—Scott Charles Richardson; Bradley A. Forrest; Schwegman Lundberg Woessner Kluth

(57) ABSTRACT

A personal computer apparatus includes a portable computer, a cellular telephone which can be connected to the portable computer, and a pager which can be connected to the cellular telephone. The portable computer, the cellular telephone, and the pager each have an independent power supply and are each detachable from the apparatus for individual functionality. When connected, the cellular telephone and pager can be coupled to the power supply of the portable computer.

15 Claims, 2 Drawing Sheets

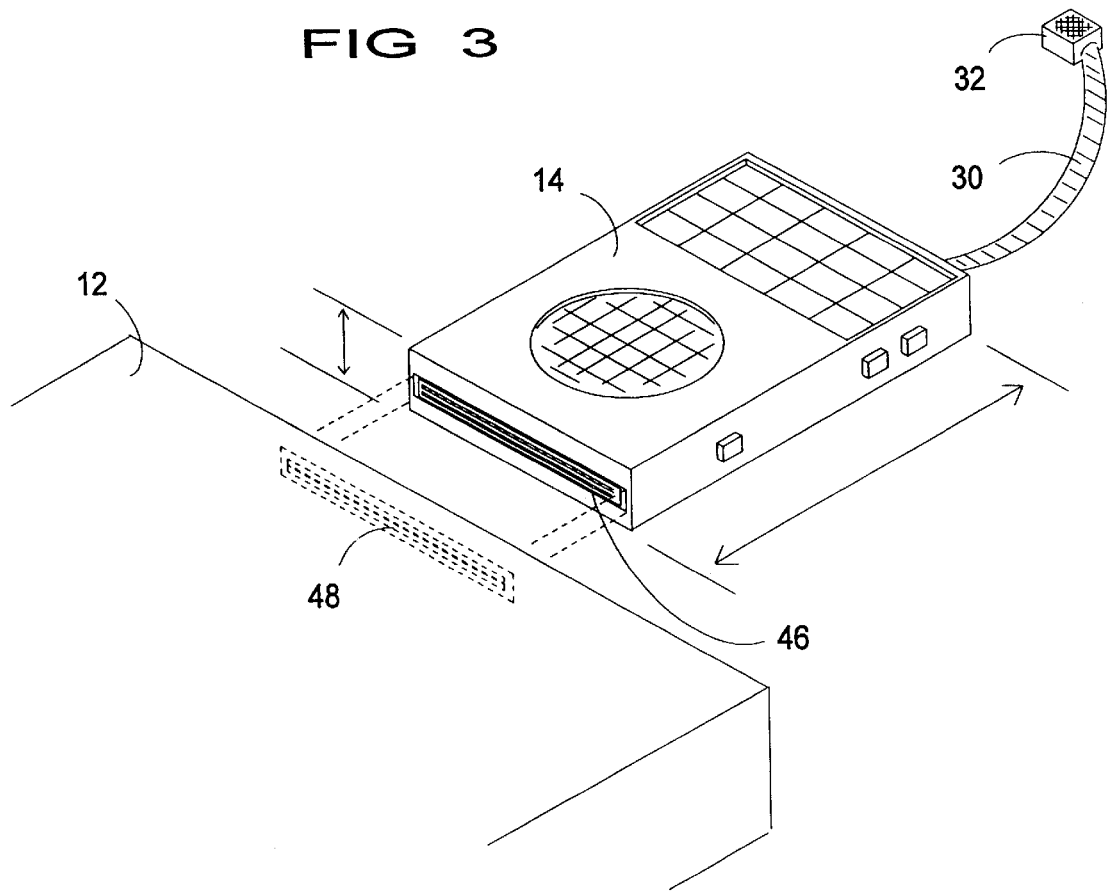

PORTABLE COMMUNICATION APPARATUS

FIELD OF THE INVENTION

The present invention relates generally to personal communication from a variety of locations, and more specifically to a modular integrated communication apparatus.

BACKGROUND OF THE INVENTION

As portable, or laptop, computers, cellular telephones, and pagers become more commonplace in today's society, consumers have become increasingly more reliant on the ability to effectively communicate with and receive communication from others via a variety of ways at any time, and at any place. Such communication may be made by cellular telephone, pager, or over a network or the internet using a computer. A variety of communication methods including electronic mail, telephone, paging, and the like, are available for nearly instant communication across large distances. When a person is for some reason away from a location where that person can usually be reached, the person often wishes to be able to not only send but receive normal communications. For example, a businessperson out of the office on business may wish to be able to send and receive messages and other information while away from the office. It has also become increasingly likely that someone wishing to get into contact with a second person who may be away from her usual location, such as on business travel or the like, will wish to resort to contacting the second person via a pager, e-mail, or telephonic communication.

Portable computers, cellular telephones, and personal pagers are all in fairly common use, each filling an aspect of modern communication needs. Many persons carry both a personal pager and a cellular telephone. Many persons when traveling away from their usual location carry a portable computer, cellular telephone, pager, or a combination of the three. Modern communication may require or dictate the use of one or more of the communication devices described above at any time. Each of these devices commonly have separate batteries for supply of power to the individual device. If the devices are used for different amounts of time, some may require recharging sooner, making power management difficult.

Cellular telephones with built in paging are known. However, it is cumbersome to carry a separate personal pager, cellular telephone, and portable computer wherever one goes. Further, to connect to a network or internet service provider (hereinafter "ISP") requires some method of connection. It is known to have a portable computer with cellular technology built in to the portable computer.

Various interconnections of modules are disclosed in the prior art. For example, U.S. Pat. No. 5,625,673 discloses a modular communications system in which a cellular telephone may be connected to a personal digital assistant (hereinafter "PDA"). The PDA in turn may be connected to a keyboard for full text input to the PDA. U.S. Pat. No. 5,550,861 discloses a modular system allowing a pager to be connected to a computer for communications.

Coordination and the avoidance of duplicative technology with respect to communication devices is important to efficient use thereof, and to an economy of space. It may be desirable to have a personal pager, a cellular telephone, and a portable computer, but there are times when only one of the devices is needed or wanted. However, the remaining devices may be needed or wanted shortly thereafter.

There is a need for a better way to obtain the benefits of each of these devices in a more convenient manner. There is a further need for better ways to manage batteries used to power such devices.

SUMMARY OF THE INVENTION

The present invention overcomes the problems of the prior art by providing a portable communication apparatus having portable computer, cellular telephone, and personal pager technology, all capable of combined operation in a connected mode not only from the same power supply, but also being capable of independent operation when separated. Although the term cellular telephone is used throughout the specification, it should be understood that as used, the term cellular telephone is defined herein to include other wireless and cordless telephones. Similarly, the term portable computer includes such designations as laptop and notebook computers.

A representative personal computer apparatus embodying the present invention includes a portable computer, a cellular telephone adapted to operatively connect to the portable computer, and a pager adapted to operatively connect to the cellular telephone. The portable computer, the cellular telephone, and the pager each have an independent power supply and are each detachable from the apparatus for individual functionality.

A portable communication apparatus embodied by the present invention has a portable computer, a cellular telephone, and a personal pager which are each separately and independently powered, and are each fully functional on their own without any requirement of assistance from the other devices. The devices of the present invention, however, are also operatively and removably connectable so as to operate under one power supply, which may be provided by the battery of the portable computer, or from an external power supply. When combined in the connected mode, the portable computer, cellular telephone, and personal pager operate as a single unit with the functional capability of all three devices. The cellular telephone may act as the communication line over which a modem in the portable computer connects to a network or other ISP, and the personal pager may be integrated with the cellular telephone and the portable computer to control certain functions of the telephone and the computer, such as alerts, power up or down, and the like.

In connected mode, the portable computer, cellular telephone, and personal pager are coupled to operate from the same power supply, or to operate from their own separate and individual power supplies as desired or selected. Any combination of the three devices could be a sub-unit of the whole, including by way of example but not limitation, the cellular telephone and the portable computer, the personal pager and the cellular telephone, the personal pager and the portable computer, the three devices each standing alone, or the three devices all operating connected together.

In another embodiment of the present invention, the cellular telephone may be connected to the personal computer via a PCMCIA interface on the telephone which engages a PCMCIA slot in the portable computer.

The cellular telephone may include a combination antenna and microphone for hands free operation. When operatively connected to the portable computer, the cellular telephone microphone may be used as a voice input device to the portable computer.

In one embodiment, two digital signal processors (DSPs), a main DSP and a secondary or sub DSP, may be used in the communication apparatus to handle input and output functions of the communication apparatus. These DSPs may be built into or added to the cellular telephone.

BRIEF DESCRIPTION OF THE DRAWINGS

FIG. 3 is a view of a PCMCIA type connection embodiment of the present invention.

DESCRIPTION OF EMBODIMENTS

Figure 1:
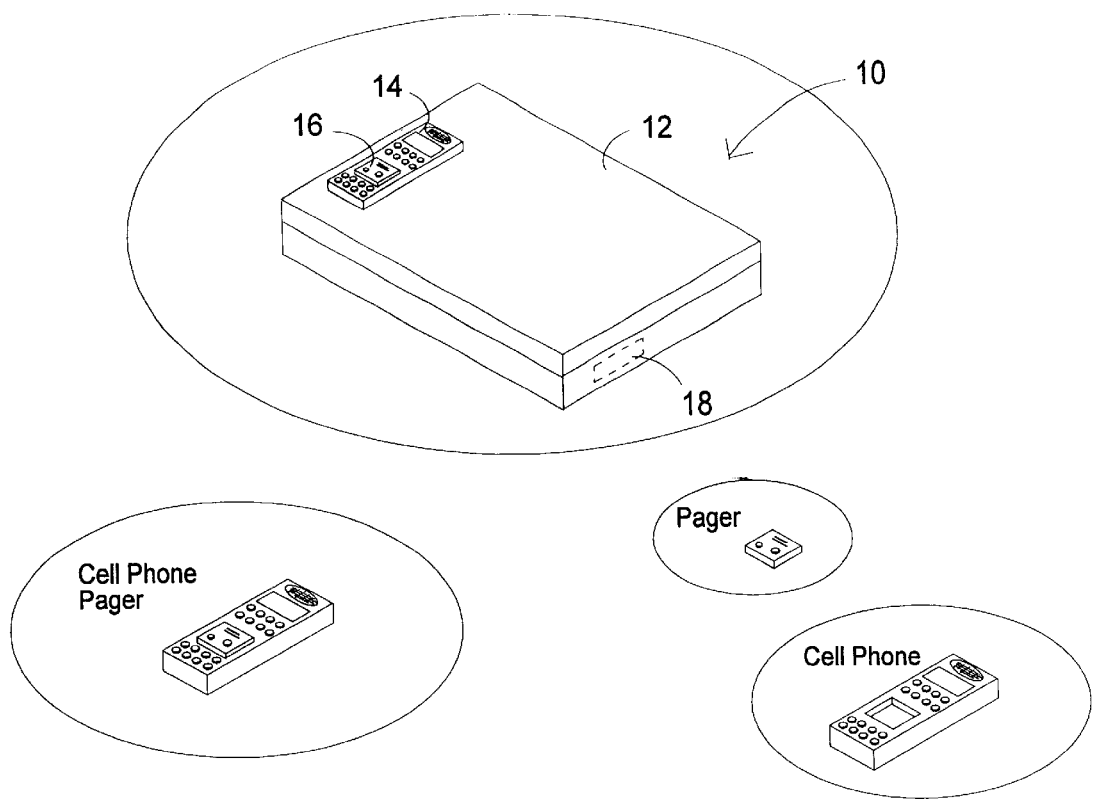
FIG. 1 is an isometric view of an embodiment of the present invention showing the components connected together.

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Referring now to the Figures, a first embodiment 10 of a communication apparatus according to the present invention comprises a portable computer 12, a cellular telephone 14, and a pager 16. The portable computer 12, cellular telephone 14, and pager 16 are integrally but removably connected together to form communication apparatus 10. It is desirable for the portable computer 12, cellular telephone 14, and pager 16 to be integrated by the connection and circuitry such that the power supply of the portable computer 12 may be coupled to the cellular telephone 14 and to the pager 16. In this embodiment, the power supply of portable computer 12 may be used as the power supply for the entire apparatus 10. For example, portable computer 12 and cellular telephone 14 may have their individual power sources connected directly.

Figure 2:
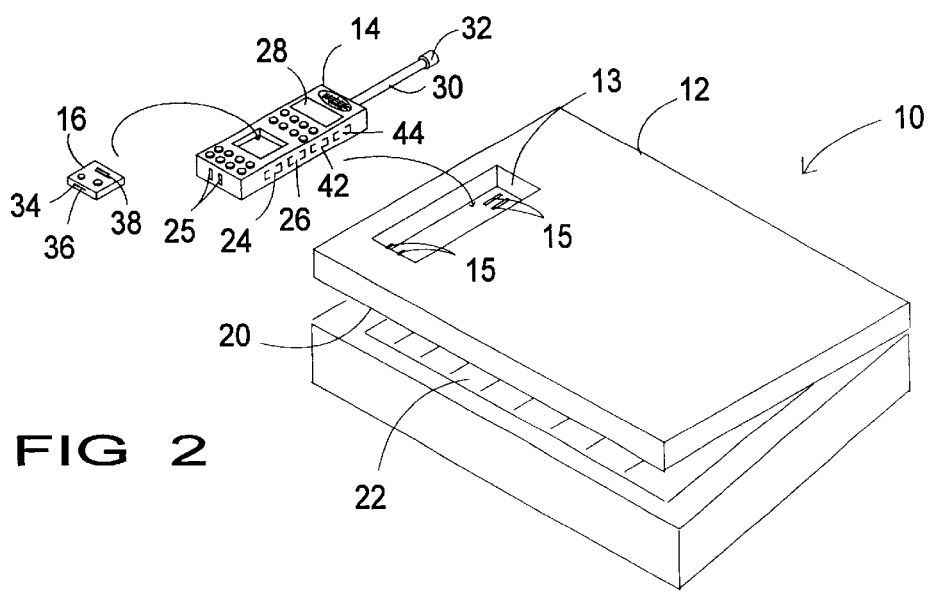
FIG. 2 is an exploded view of the embodiment of FIG. 1 showing the separated components.

A cradle 13 in portable computer 12 may be used to position and hold the cellular telephone in place when the cellular telephone and portable computer are in connected mode. Power and communication connections between portable computer 12 and cellular telephone 14 may also be made at the cradle 13. Referring now also to FIG. 2, exemplary power and communication connections between portable computer 12 and cellular telephone 14 are shown. In one embodiment as shown in FIG. 2, charging and/or power connections 25 are shown on cellular telephone 14. These charging and/or power connections 25 electrically contact power connections in cradle 13 of portable computer 12 to provide power from power supply 18 of portable computer 12 to cellular telephone 14. The communication connections and communication lines are able to treat the cellular telephone like a modem, and allow the portable computer to issue standard modem commands and the like to the cellular telephone.

Alternative positions of charging and/or power connections 25 are shown at 15' of FIG. 2. Alternative charging and/or power connections on cellular telephone 14 (not shown) are positionable to contact charging and/or power connections 15' in cradle 13. When cellular telephone 14 is placed into cradle 13, suitable connections between portable computer 12 and cellular telephone 14 are made to allow the cellular telephone 14 and the portable computer 12 to operate from the power supply 18 of portable computer 12.

Alternative charging and/or power connections will be apparent to those skilled in the art, and are within the scope of the invention. Alternative connections include, by way of example but not by way of limitation, slide connections, cord connections, serial and parallel connections, and the like.

Similarly, communication connections between portable computer 12 and cellular telephone 14 may be positioned so as to interconnect portable computer 12 and cellular telephone 14.

Portable computer 10 preferably has the capability of connection to an external power source such as AC power, so that the battery of portable computer 12 may be conserved and/or recharged when the portable computer is near an available and adequate source of external power. When cellular telephone 14 and pager 16 are combined with portable computer 12 in connected mode, the external power source charging portable computer 12 also charges cellular telephone 14 and pager 16 by way of the interconnection of the power supplied of the three individual devices when combined in connected mode.

Each of the components of the communication apparatus 10 is preferably a stand alone unit having its own functionality when separated from the apparatus 10. Therefore, the portable computer 12 has an independent power source 18, a display screen 20, a keyboard or other input device 22, and associated processing and computing hardware and software (not shown). The cellular telephone 14 has an independent power supply 24, transceiver 26, and display 28. Cellular telephone 14 may further be configured to be connectable to a standard telephone jack for use. The pager 16 has an independent power supply 34, a receiver 36, and a display 38. Pager 16 may also be configured, as is well known in the art, to have both a receiver and a transmitter. The receiver and transmitter may similarly be combined into a single transceiver.

Cellular telephone 14 may also be configured with an antenna 30 having a microphone 32 built into the antenna 30. Microphone 32 may be positioned at any location along antenna 30. In one embodiment, shown in FIG. 2, microphone 32 is located at the far, or distal, end of the microphone, most removed from the cellular telephone 14. Antenna 30 may be retractable into the body of the cellular telephone 14.

Referring now to FIG. 2, a representative view of a connection and interconnection between the portable computer 12, cellular telephone 14, and pager 16 may be seen. Other interconnection configurations will be apparent to those skilled in the art, and there is no intention to limit the interconnection details to those shown in the Figure. For example, but not by way of limitation, such interconnection configurations could include PCMCIA, device bay connection, and proprietary connection. In FIG. 2, cellular telephone 14 and pager 16 are shown to interconnect with each other, and the combination cellular telephone and pager connect to the portable computer 12.

The interface between cellular telephone 14 and portable computer 12 may be made by any number of connection configurations. For example, but not by way of limitation, connection may be made directly between the power supplies Two digital signal processors (DSPs) 42 and 44, with associated circuitry, may be connected or built in to the cellular telephone 14 to assist in the control of the communication and power connection interfaces between the pager 16 and the cellular telephone 14, as well as between the cellular telephone 14 and the portable computer 12. These digital signal processors 42 and 44 include main DSP 42 and sub or secondary DSP 44. Main DSP 42 operates to assist in the control of the interfaces described above between the cellular telephone and the portable computer, as well as the interface between the pager and the cellular telephone.

Secondary or sub DSP 44 may be used to manage the input/output functions between the various components of the communication apparatus 10. The connection and operation of DSPs is well known and will not be described further herein.

When the communication apparatus 10 is fully combined in connected mode, with all components, portable computer 12, cellular telephone 14, and pager 16, various functions and capabilities of the individual components may be used to complement functions of the remaining components. For example, pager 16 and/or telephone 14 could be used to control certain computer functions such as alert, power on, power off, and the like.

In another embodiment as shown best in FIG. 3, the cellular telephone 14 may be adapted to connect to the portable computer via a PCMCIA slot. The cellular phone with PCMCIA connection 46 on cellular telephone 14 allows the cellular telephone 14 to be connected to a PCMCIA slot 48 on the portable computer 12. The connection may be made with two type 2 PCMCIA slots, or with one PCMCIA type 3 slot. The PCMCIA connection 46 on the cellular telephone 14 allows the cellular telephone 14 to be directly connected to the portable computer 12 to allow transmission of information more readily between the cellular telephone 14 and the portable computer 12.

It will be readily seen that the interconnection between portable computer 12, cellular telephone 14, and pager 16 allow communication apparatus 10 to function as a total communications package, allowing connection to a network or the internet, allowing outgoing and incoming telephone transmissions, allowing the receipt of pages, allowing the transmission and receipt of facsimile messages with appropriate software for portable computer 12, and the like. The communication apparatus 10 is versatile enough to allow disconnection of one or more of its components for stand alone use. For example, if the user of the communication apparatus 10 wished to leave the location at which the user was, but did not wish to carry or transport the entire communication apparatus 10, the user could choose which components of the apparatus 10 he wished to carry. For a short absence, pager 16 may be the only component the user wishes to take. For certain instances, only the cellular telephone 14 may be desired. It is a simple matter to disconnect the individual component desired from the communication apparatus as a whole. In this way, the total communication apparatus 10 becomes even more versatile for everyday use.

Power management functions of the communication apparatus 10 allow cellular telephone 14 and pager 16 to be coupled to power supply 18 of portable computer 12. When so coupled or operatively connected, the cellular telephone 14 and pager 16 operate using power from the power supply 18 of portable computer 12. Charging and recharging of portable computer 12, cellular telephone 14, and pager 16 can be accomplished more easily, and controlled more closely.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A personal computer apparatus, comprising:
    a portable computer;
    a cellular telephone adapted to be removable connectable to the portable computer,
    wherein the cellular telephone comprises an antenna having a microphone built into the antenna; and
    a pager adapted to be removable connectable to the cellular telephone, wherein the pager is further adapted to operatively connect to the portable computer to control a function of the portable computer;
    wherein the portable computer, the cellular telephone, and the pager each have an independent power supply and are each detachable from the apparatus for independent, individual functionality.

2. A personal computer apparatus as described in claim 1, wherein the cellular telephone is adapted to engage a PCMCIA slot in the portable computer.

3. A personal computer apparatus as described in claim 2, wherein the PCMCIA slot is a type 3 slot.

4. A personal computer apparatus as described in claim 1, wherein the cellular telephone is coupled to the portable computer power supply.

5. A personal computer apparatus as described in claim 4, wherein the pager is coupled to the portable computer power supply.

6. A personal computer apparatus as described in claim 1, wherein the cellular telephone is operatively connected to the portable computer to control remote computer apparatus access.

7. A personal computer apparatus as described in claim 1, wherein the function is selected from a list consisting of alerts, power up, and power down.

8. A personal computer apparatus as described in claim 1, wherein the cellular telephone further comprises:
    a digital signal processor operatively connected to assist in control of the interfaces between the portable computer, the cellular telephone, and the pager.

9. A personal computer apparatus as described in claim 7, wherein the cellular telephone further comprises:
    a second digital signal processor operatively connected to assist in management of the input and output functions of the portable computer, the cellular telephone, and the pager.

10. A personal computer apparatus as described in claim 1, wherein the microphone is attached to the distal end of the antenna.

11. A modular communication system, comprising:
    a portable computer having an independent power supply and a PCMCIA slot;
    a cellular telephone having an independent power supply and a PCMCIA interface, the cellular telephone removably connectable by the PCMCIA interface to the portable computer via the PCMCIA slot, and the cellular telephone capable of being coupled to the portable computer power supply so as to operate either under the cellular telephone power supply or the portable computer power supply, wherein the cellular telephone comprises an antenna having a microphone built into the antenna; and
    a pager having an independent power supply, the pager removably connectable to the cellular telephone so as to operate either under the pager power supply or the cellular telephone power supply, wherein the portable computer, the cellular telephone, and the pager are each detachable from the modular communication system for independent, individual functionality, wherein the pager is further adapted to operatively connect to the portable computer to control a function of the portable computer.

12. A modular communication system as described in claim 11, wherein the microphone is operatively connected at the distal end of the antenna.

13. A modular communication system as described in claim 11, and further comprising:
- a first digital signal processor operatively connected to assist in control of the interfaces between the portable computer, the cellular telephone, and the pager; and
- a second digital signal processor operatively connected to assist in management of the input and output functions of the portable computer, the cellular telephone, and the pager.

14. A modular communication system, comprising:
- a portable computer having an independent power supply;
- a wireless telephone comprising an antenna having a microphone built into the antenna;
- a pager; and
- means for removably, operatively interconnecting the portable computer, the wireless telephone, and the pager to couple the wireless telephone and the pager to the independent power supply, wherein the portable computer, the wireless telephone, and the pager are each detachable from the modular communication system for independent, individual functionality, and wherein the pager is to control a function of the portable computer.

15. A method of assembling a communication system having a portable computer with a power supply, a cellular telephone, and a pager, each having independent functionality, the method comprising:
- providing communication and power connections on the portable computer for the coupled connection of the cellular telephone to the portable computer, wherein the cellular telephone comprises an antenna having a microphone built into the antenna;
- connecting the portable computer and the cellular telephone via the communication and power connections to couple the cellular telephone to the power supply of the portable computer; and
- connecting the pager to the cellular telephone, wherein the portable computer, the cellular telephone, and the pager are each detachable from the communication system for independent, individual functionality, wherein the pager is further adapted to operatively connect to the portable computer to control a function of the portable computer.

* * * * *